United States Patent [19]

Pettigrew

[11] Patent Number: 4,636,076
[45] Date of Patent: Jan. 13, 1987

[54] DISPLACEMENT MEASURING APPARATUS AND METHOD

[75] Inventor: Robert M. Pettigrew, Cambridgeshire, England

[73] Assignee: Dr. Johannes Heidenhain GmbH, Traunreut, Fed. Rep. of Germany

[21] Appl. No.: 635,453

[22] Filed: Jul. 30, 1984

[30] Foreign Application Priority Data

Jul. 30, 1983 [GB] United Kingdom ............ 8320629

[51] Int. Cl.$^4$ .............................................. G01B 09/02
[52] U.S. Cl. .................................................. 356/356
[58] Field of Search ...................... 356/354, 355, 356

[56] References Cited

FOREIGN PATENT DOCUMENTS 1474049  5/1977  United Kingdom .

OTHER PUBLICATIONS

Rassudova et al., "Miniature Sensor of Linear Displacements", Sov. J. Opt. Technol., vol. 43, No. 4, pp. 235-237, Apr. 1976.
USSR Inventor's Certificate No. 1,093,889.
G. S. Landsberg "Optics", Moscow, 1954, pp. 167-169 §50, Michelson's Echelon.
Optics & Spectroscopy, vol. 14, 1963, pp. 215-219, Rassudova and Gerasimov, Use of Reflecting Diffraction Gratings in Interference Systems for Measuring Linear Shifts.

Primary Examiner—Davis L. Willis
Assistant Examiner—Matthew W. Koren
Attorney, Agent, or Firm—Willian Brinks Olds Hofer Gilson & Lione Ltd.

[57] ABSTRACT

Apparatus for measuring displacement comprises a member, such as a reading head, which carries a stepped index diffraction grating (14) and is movable with respect to a reflective scale grating (16). The head also carries a source (10) and lens for directing light on to the index grating and then on to the scale grating for reflection to the index grating, with the resultant Moire bands detected by a photodetector (18) on the reading head. In order to determine the phase separation or offset, and to avoid high sensitivity thereof to the spacing between the gratings, the index grating (14) has a square-stepped profile resulting in graded, increasing thickness. Alternatively, a conventional index grating may be employed in conjunction with a stepped profile optical element interposed between the two gratings.

18 Claims, 2 Drawing Figures

DISPLACEMENT MEASURING APPARATUS AND METHOD

DESCRIPTION

1. Field of Invention

This invention relates to a displacement measuring apparatus and method, relying on the use of devices called Moire encoders which can measure longitudinal or angular displacements.

2. Background to the Invention

The invention commences from the art known in British Patent Specification No. 1474049 (Leitz) and a paper by Rassudova and Gerasimov published in Optical Spectroscopy 14, 215 (1963). This art shows three grating interference structures which in practical forms are reduced to two grating structures by making one of the gratings reflective. Moire bands are generated and examination of these bands enables the magnitude and direction of relative movement between the two gratings to be obtained.

The present invention aims to provide very high resolution and relaxed alignment tolerances using fine gratings typically having a pitch of 40 $\mu$meters. The Moire bands are examined by photodetectors which for accuracy should see the same scanning field. It is therefore desirable to use focal plane detectors and to use diffraction orders $-1, 0, +1$.

It is therefore necessary to get phase separation between the signals sent by the detectors. In the Specification of Leitz, one grating is tilted relative to the other in order to provide differential spacing between the gratings. The main disadvantage of this system is that the magnitude of the phase separation or offset depends largely on the gap between the two gratings. For fine pitch gratings (e.g. 8 $\mu$meters) this gap may be of the order of tens of $\mu$meters, and a small change in the separation may lead to an unacceptable change in relative phase. The invention aims to provide an alternative means and method for obtaining phase offset which does not suffer from the disadvantage of Leitz.

SUMMARY OF THE INVENTION

According to one aspect of the invention displacement measuring apparatus for measuring relative displacement between two members comprises an index grating mounted on one member, a reflective scale grating mounted on the other member, a light source for illuminating the index grating and then the scale grating with light so that an image of the scale grating interacts with the index grating to form an interference image, and a plurality of detectors for detecting the interference image and deriving corresponding output signals representative of relative movement between the two members, said output signals differing in phase in consequence of the optical path length of the light from the index grating to the scale grating being different from the optical path length of the light from the scale grating to the index grating by virtue of the light passing through different thicknesses of a material having a refractive index different from the ambient medium.

The differing path lengths are preferably achieved by arranging the index grating to be of a stepped profile, but an alternative arrangement is for the index grating to be conventional and a stepped member to be inserted between the index and scale gratings to impose the necessary optical path length difference.

The step height of the stepped index grating determines the phrase separation of the output signals, and this height is preferably set so that the phase separation is 120°.

The index grating preferably has a square profile grating and is designed to maximise both the light transmission efficiency and the depth of modulation in the first order light signals.

The scale grating ideally has 100% reflectivity, is preferably made from a robust and durable material and has a rectangular profile groove. The grating may be made by using ultra-violet curing polymers, which provide for accurate and reliable replication. Ultra-violet curing polymers are widely used as bases in screen printing. When loaded with inks these materials can be coated onto plastics or metals. Exposure to ultra-violet light results in polymerisation of the material to give a stable compound, bonded to the base.

According to another aspect of the invention a method of measuring relative displacement between two members respectively carrying an index grating and a reflective scale grating, comprises illuminating the index grating and the scale grating with light whereby an image of the scale grating interacts with the index grating to form an interference image, detecting the interference image and deriving corresponding output signals representative of relative movement between the two members, and imparting phase separation or phase offset to the output signals by arranging the optical path lengths of the light from the index grating to the scale grating to be different from the optical path length of the light from the scale grating to the index grating by virtue of the light passing through different thicknesses of a material having a refractive index different from the ambient medium.

As with said one aspect of the invention, the index grating is preferably of stepped shape, having right angle steps of uniform step height to give the index grating a progressively increasing thickness. As before, the height of each step of the stepped index grating determines the phase offset or separation which does not depend on the inter-grating spacing, in contrast to the arrangement of Leitz.

The invention will now be further described by way of example with reference to the accompamying drawings, in which:

FIG. 1 is an optical diagram of displacement measuring apparatus according to the invention, and FIG. 2 is an enlarged view of part of FIG. 1.

DETAILED DESCRIPTION OF THE DRAWING

Figure 1:
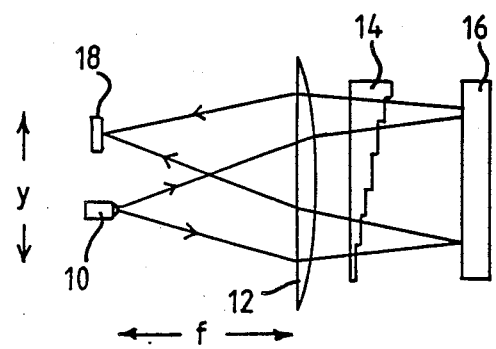

Referring to FIG. 1, the apparatus comprises a light source 10, a lens 12, a stepped index grating 14, a reflective scale grating 16 and three focal plane photodetectors (represented by 18) at positions corresponding to the zero order and first order images of the source 10. In a practical embodiment, the components 10, 12, 14 and 18 would be mounted on a reading head movable with respect to the reflective scale grating 16. Output signals from the photodetectors 18 would provide a measure of the direction and magnitude of the displacement of the reading head relative to the stationary scale grating 16. Linear and angular movement between members can be measured.

Figure 2:
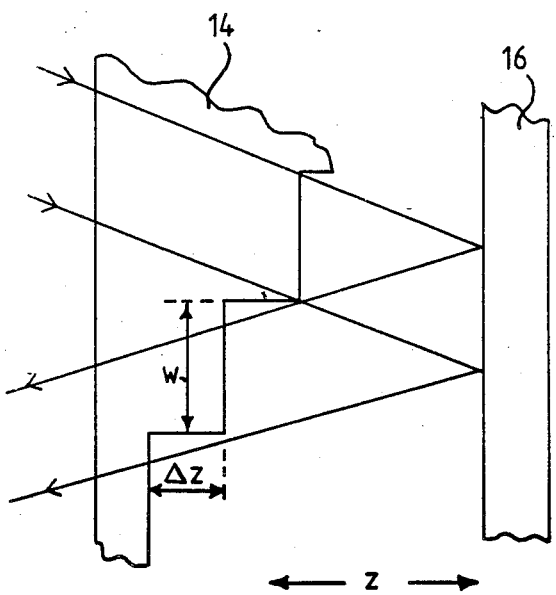

Referring to FIG. 2, the glass of the index grating 14 has a plurality of steps of identical height $\Delta z$ and identical spacing W. The gap between the gratings 14 and 16 is Z. It can be seen for the representative light rays shown in FIG. 2, that the optical path of the light from the index grating 14 to the scale grating 16 is shorter than the return path length from the scale grating 16 to the index grating 14 by an amount dependent on the refractive index of the material of the steps of the index grating 14.

The steps formed on the index grating impart a phase separation to the output signals produced by the photodetectors 18. Further, the step height $\Delta z$ determines the phase separation, and this step height is chosen to give 120° phase separation between the output signals.

A practical system may have the following values:
Z = nominal grating gap = 5 mm
f = focal length of lens 12 = 30 mm
y = detector/source spacing = 6 mm
d = grating pitch = 8 $\mu$m
$\lambda$ = illumination wavelength = 0.93 m This gives the following dimensions for each step of the index grating 14:
Step height $\Delta z$ = 0.045 mm
Step width w = 1.0 mm

I claim:

1. Displacement measuring apparatus for measuring relative displacement between two members, comprising an index grating mounted on one member, a reflective scale grating mounted on the other member, a light source for illuminating the index grating and then the scale grating with light so that an image of the scale grating interacts with the index grating to form an interference image, a lens and at least three detector, each detector located in the focal plane of the lens and operative to detect a respective one of three selected diffraction orders of the interference image, the detectors operative to derive corresponding output signals representative of relative movement between the two members, said output signals differing in phase in consequence of the optical path length of the light from the index grating to the scale grating being different from the optical path length of the light from the scale grating to the index grating by virtue of the light passing through different thicknesses of a material having a refractive index different from the ambient medium, wherein all three of the seleced diffraction orders of light from a selected ray pass from the index grating to the scale grating through a first constant thickness of material, and wherein all three of the selected diffraction orders of light from the selected ray pass from the scale grating to the index grating through a second constant thickness of material different from the first constant thickness, the thickness of the material being measured perpendicular to the plane of the scale grating.

2. Apparatus according to claim 1, wherein the index grating is of non-uniform increasing thickness.

3. Apparatus according to claim 2, wherein the index grating has a stepped profile.

4. Apparatus according to claim 3, wherein the index grating has a stepped face on the side facing the scale grating.

5. Apparatus according to claim 1, having an optical element of non-uniform increasing thickness interposed between the index grating and the scale grating.

6. Apparatus according to claim 5, wherein the said optical element has a stepped profile.

7. Apparatus according to claim 3, wherein the step height is predetermined to impart a selected phase separation to the output signals.

8. Apparatus according to claim 7, wherein the step height is predetermined to impart a phase separation of 120°.

9. Apparatus according to claim 3, wherein the stepped profile is formed by square steps.

10. Apparatus according to claim 9, wherein the square step profile comprises uniformly spaced steps of uniform height.

11. Apparatus according to claim 1, wherein the scale grating has nominal 100 percent reflectivity.

12. Apparatus according to claim 1, wherein the scale grating has a rectangular profile groove.

13. A method of measuring relative displacement between two members respectively carrying an index grating and a reflective scale grating, comprising the steps of illuminating the index grating and the scale grating with light whereby an image of the scale grating interacts with the index grating to form an interference image, using a lens to focus three selected diffraction orders of the interference image onto at least three detectors respectively and deriving corresponding output signals representative of relative movement between the two members, and imparting phase separation or phase offset to the output signals by arranging the optical path lengths of the light from the index grating to the scale grating to be different from the optical path length of the light from the scale grating to the idex grating by virtue of the light passing through different thicknesses of a material having a refractive index different from the ambient medium, wherein all three of the selected diffraction orders of light from a selected ray pass from the index grating to the scale grating through a first constant thichness of material, and wherein all three of the selected diffraction orders of light from the selected ray pass from the scale grating to the index grating through a second constant thickness of material different from the first constant thickness, the thickness of the material being measured perpendicular to the plane of the scale grating.

14. A method as claimed in claim 13, according to which the index grating has a stepped shape formed by right angle steps of uniform height at uniform spacing.

15. Displacement measuring apparatus for measuring relative displacement between two members, comprising:
an index grating of non-uniform thickness mounted on one member;
a reflective scale grating mounted on the other member;
a light source for illuminating the index grating and then the scale grating with light so that an image of the scale grating interacts with the index grating to form an interference image;
a lens defining a focal plane;
at least three detectors, each detector located in the focal plane of the lens and operative to detect a respective one of the zero order, the positive first order and the negative first order of the interference image, the detectors operative to generate corresponding output signals representative of relative movement between the two members; and
the apparatus such that the output signals differ in phase in consequence of the optical path length of the light from the index grating to the scale grating being different from the optical path length of the light from the scale grating to the index grating by virtue of the light passing through different thicknesses of a material having a refractive index different from the ambient medium, the apparatus further operative such that the zero, positive first and negative first orders of light from a selected ray pass from the index grating to the scale grating through a first constant thickness of material and the zero, positive first and negative first orders of light from the selected ray pass from the scale grating to the index grating through a second constant thickness of material different from the first constant thickness, the thickness of the material being measured perpendicularly to the plane of the scale grating.

16. Apparatus according to claim 15 wherein the index grating comprises a stepped profile.

17. Apparatus according to claim 15 wherein the index grating is of uniform thickness and wherein an optical element of non-uniform increasing thickness is interposed between the index grating and the scale grating.

18. Apparatus according to claim 16 wherein the optical element comprises a stepped profile.

* * * * *

UNITED STATES PATENT AND TRADEMARK OFFICE
CERTIFICATE OF CORRECTION

PATENT NO. : 4,636,076
DATED : January 13, 1987
INVENTOR(S) : Robert M. Pettigrew It is certified that error appears in the above-identified patent and that said Letters Patent is hereby corrected as shown below:

IN THE SUMMARY OF THE INVENTION

In column 1, line 67, please delete "betwen" and substitute therefor --between--;

In column 2, line 2, please delete "phrase" and substitute therefor --phase--;

In column 3, line 30, please delete "detector" and substitute therefor --detectors--;

In column 3, line 44, please delete "seleced" and substitute therefor --selected--;

In column 4, line 28, please delete "idex" and substitute therefor --index--;

In column 4, line 33, please delete "thichness" and substitute therefor --thickness--.

Signed and Sealed this

Twenty-sixth Day of April, 1988

Attest:

DONALD J. QUIGG

Attesting Officer

Commissioner of Patents and Trademarks